Nov. 26, 1940.  D. A. CUMFER  2,223,314

SILENT CHAIN

Filed March 23, 1940

INVENTOR
Donald A. Cumfer
BY Feyrer and Mack
ATTORNEYS

Patented Nov. 26, 1940

2,223,314

UNITED STATES PATENT OFFICE 2,223,314

SILENT CHAIN

Donald A. Cumfer, Ridgewood, N. J., assignor to Willcox & Gibbs Sewing Machine Company, New York, N. Y., a corporation of New York Application March 23, 1940, Serial No. 325,488

14 Claims. (Cl. 74—243)

This invention relates to chains, and especially to so-called silent drive chains constructed from links.

Drive chains constructed of links are in general use on many types of machines and apparatus. Ordinarily link chains are quite noisy, but silent chains have been constructed of materials such as pressed fiberboard. In spite of their advantage of quiet operation, fiberboard chains have not been extensively adopted, partly because their period of useful life is so very much shorter than the life of a metal chain.

In the past chain manufacturers and users have had great difficulty in properly lubricating chains. Splash, pump, drip, spray, and hand oiling have all been tried, but thousands of dollars are still being lost annually because of breakdowns or failures resulting from unsatisfactorily lubricated chains.

The weight and balance of a chain affects its usefulness and life considerably. The replacement costs of a chain drive include not only the chain but also the sprockets, which are worn away by the constant noisy beating and weight of a steel chain.

An object of this invention is to provide a silent chain having a very long period of usefulness. Another object is to provide a chain capable of going relatively long periods of time without lubrication.

Further objects include: the provision of a link chain having a small weight in comparison to other chains of the same width; and the provision of nonmetallic members in the chain to reduce wear upon the sprocket.

A feature of the present invention is the use of metallic shrouds, thereby furnishing wear-resisting guide plates to keep the chain upon the sprocket, and particularly the arrangement of the metallic shrouds so as to contribute to the balance, tensile strength and life of the chain. The metallic shrouds also cooperate with metallic links to provide metallic connections running continuously throughout the length of the chain.

Another feature is the use of links made of nonmetallic material in a balanced arrangement relative to cooperating metallic links so that noise is greatly reduced.

Other features of this invention include the use of a material for the nonmetallic links which has: certain resiliency so that the sprocket is worn very slowly; a high tensile strength to increase the life of the belt; a sound deading quality; and, of special importance, the property of absorbing lubricating oil without materially impairing the acoustical, resilient, or tensile strength properties thereof.

Yet another feature of much importance is the use of metallic links in the chain in addition to and in conjunction with the nonmetallic links. These metallic links, by themselves, and/or with the metallic shrouds, form a continuous band of metallic strength through the chain, thereby greatly adding to the life of the chain, but without materially impairing the quietness resulting from the use of the nonmetallic links.

Another feature of the present invention is the provision of an odd number of alternate laminae of metallic and nonmetallic links, or group of links, thereby assuring better distribution of oil to the metallic links. A further feature is the provision of a balanced arrangement of metallic and nonmetallic links with metallic shrouds to insure a uniform weight and strength throughout the length of the chain.

Other objects and features will appear hereinafter.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Figure 1:
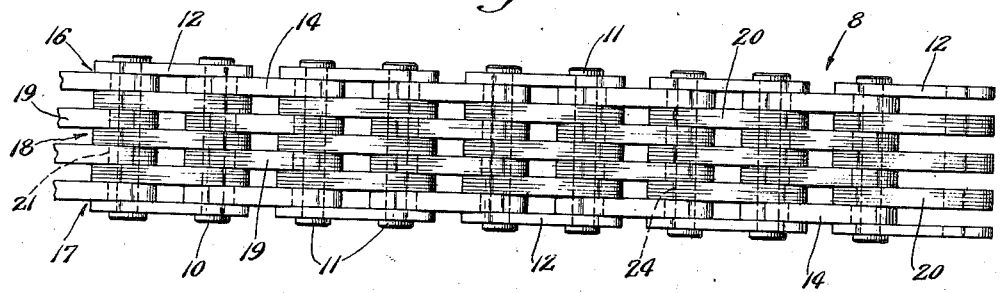
Figure 1 shows a top view of one embodiment of this invention.
Figure 2:
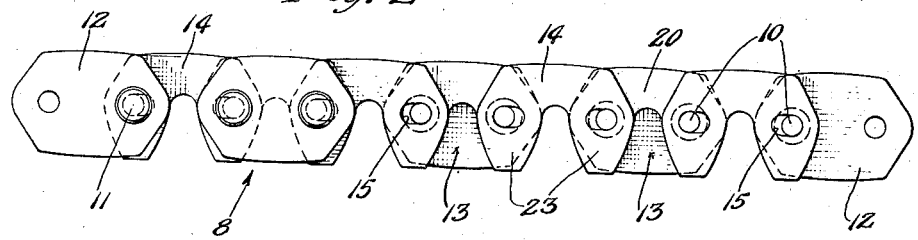
Fig. 2 is a side view of Fig. 1.

Referring now in detail to the drawing, and particularly to Figs. 1 and 2, there is shown a chain 8 including a plurality of pins 10 flattened at each end to form retaining heads 11. Metallic shrouds 12 adjacent the retaining heads 11 form the outer connecting links between certain of the pins, and have guard sections 13 designed to prevent the chain from having undue sideslip upon the sprocket. Metallic links 14 adjacent to the shrouds, and connecting the pins, are provided with holes 15 which are preferably elongated. In the embodiment illustrated, the metallic links 14 are used only to join pins not connected to each other by means of shrouds 12. The shrouds 12 and links 14 form two continuous groups of connectors 16 and 17 of metallic strength throughout the length of the chain and form the outside portions of the chain. The continuous run of metal connectors 16 and 17 greatly increases the life of the chain, and will not permit the chain to break until it has experienced almost as severe service as is necessary to break an all-metal chain.

Pairs of pins connect pairs of shrouds to form shrouded sets. Between the shrouded sets are unshrouded sets consisting of metallic and nonmetallic toothed links, located intermediate the shrouded sets by means of the pins of the shrouded sets. The continuous chain is constructed of shrouded sets and unshrouded sets spaced alternately and in balanced relation to each other.

A group of nonmetallic connectors 18 made up of a plurality of nonmetallic links 19 and 20 is interposed between the groups of metallic connectors 16 and 17 to form a continuous run of nonmetallic toothed links centrally longitudinally disposed. The links 19 and 20 are connected to and pivot about the pins 10. The link 19 compares in shape to the link 14, each having holes 21 which are preferably elongated. The links 19 are used to connect pins not joined together by shrouds 12 and are members of unshrouded sets. The links 20 are similar to the links 19 by having gear teeth 23 of appropriate design. However, each end of the links 20 has a hole 24, preferably round, adapted to receive a pin 10. Links 20 are used to connect pins 10 joined by shrouds 12 and are, therefore, members of shrouded sets.

Now of particular importance, and acording to the present invention, it should be noted that the links 19 and 20 are made of nonmetallic material. Quietness of operation is assured by selecting for the material for the links 19 and 20 a substance having acoustical properties that it will deaden sound appreciably. The surprising phenomena of a chain having metal teeth being quiet in operation is believed to be partly explained by the fact that the nonmetallic links absorb and deaden the noise produced by the clashing of metal teeth.

Another important property of the material used for the links 19 and 20 is its oil-absorbing property. Many chain failures have been caused by faulty lubrication. By the use of a material which absorbs and retains oil for some period of time, it is possible for the chain to operate for many hours upon the residual lubricant absorbed upon and within the links 19 and 20. The lubrication can be much less frequent when oil-absorbing nonmetallic links 19 and 20 are used than has been true for any of the usual types of chains capable of transmitting an equal amount of power.

The material used for the links 19 and 20 is preferably somewhat resilient, and able to cushion the blow when struck by the sprocket teeth, thereby lengthening the life of both the sprocket and the chain. Because of the metallic connectors 16 and 17 the tensile strength of the material used for the links 19 and 20 is not of as great importance as it is if the chain were made entirely of nonmetallic links. It is desirable to use the highest tensile strength obtainable without too great a sacrifice in sound-absorbing, oil-absorbing, and resilient properties.

According to the present invention the nonmetallic links are preferably made from sheets of modern synthetic plastic, particularly that type sold commercially as "Micarta." Materials including sheets of cloth bonded under great pressure with a suitable plastic binder are very satisfactory for the nonmetallic links.

Figure 3:
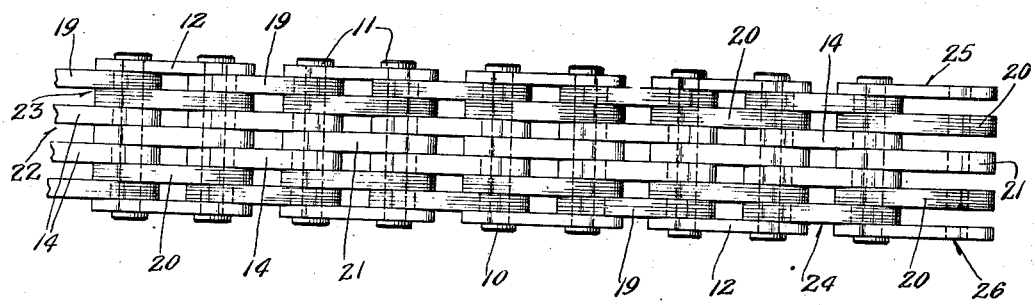
Fig. 3 is a top view of another chain embodying this invention.

In Fig. 3 the pins 10, head 11, shrouds 12, guard plates 13, metallic links 14 and nonmetallic links 19 and 20 are the same as in Fig. 1. A metallic link 21, similar in shape to the nonmetallic link 20, is designed to connect pins joined by shrouds. In Fig. 3, however, there is illustrated a chain differing from the arrangement of the groups of links 16, 17 and 18. Instead of having nonmetallic links 19 and 20 in the center, the form of the invention illustrated in Fig. 3 has metallic links 14 and 21 in the center, with nonmetallic links 19 and 20 on each side thereof. A group of metallic connectors 22, made up of metallic links 14 and 21, is interposed between two groups of nonmetallic connectors 23 and 24, made up of nonmetallic links 19 and 20. The shrouds 12 form part of two uncompleted groups of connectors 25 and 26. Unless a wide chain is desired, it is deemed preferable to leave groups 25 and 26 uncompleted, and to use only three completed groups. For very wide chains, however, nine, eleven or any other number of alternate metallic groups and nonmetallic groups might be used. This form of the invention has the same advantage as the first form; viz., each of the sets are of substantially the same weight to insure quiet and long running (e. g., where two thick metallic links are provided in alternate sets no shroud plates are provided and in the alternate sets where only one thick metallic link is used a pair of thin shroud plates is provided). It should be noted that the present structure achieves a balanced chain inasmuch as each shrouded set has substantially the same weight as each unshrouded set in the same chain (e. g., two nonmetallic links plus two thick metallic links in the nonshrouded sets are substantially the same in weight as the other alternate shrouded sets which include three nonmetallic links and two thin metallic shroud plates). Each shrouded set has fewer metallic links than the unshrouded sets to compensate for the weight of the metallic shrouds.

The balanced chain makes possible a smooth, quiet operation and gives a long period of useful life. Also, it should be noted that the alternate sets of metallic shroud plates and intermediate metallic toothed links provide two continuous runs of metallic members, one at each side of the chain to effectively maintain the chain at its original length and to prevent adverse wear on the pin holes of the nonmetallic links therebetween.

Bolts might be used instead of pins, and other modifications might be made without departing from the spirit of the invention.

Having thus described the invention, what is claimed as new is:

1. In a silent chain the combination of shrouded sets; unshrouded sets, of substantially the same weight as the shrouded sets; and pins connecting said shrouded and unshrouded sets together.

2. In a silent chain the combination of metallic toothed links; nonmetallic toothed links; shroud plates; and means connecting said metallic and nonmetallic toothed links and said shroud plates together to make a continuous run of shrouded and unshrouded sets of links and with fewer metallic links in the shrouded sets than in the unshrouded sets.

3. In a silent chain the combination of nonmetallic links; metallic links; shroud plates;

and means interconnecting metallic and nonmetallic links to form alternate unshrouded sets and for concurrently connecting nonmetallic links and shroud plates to form alternate shrouded sets, with the shrouded and unshrouded sets of substantially the same weight.

4. In a silent chain the combination of nonmetallic toothed links; a plurality of pins connecting said links together in a continuous chain; only metallic shroud plates and nonmetallic toothed links with a pair of pins forming alternate shrouded sets in the silent chain; and only metal and nonmetallic toothed links connected to and intermediate the pins of said shrouded sets.

5. In a silent chain the combination of a plurality of centrally longitudinally disposed nonmetallic toothed links; a plurality of outwardly disposed metallic toothed links and shroud members; and pins interconnecting all of said central nonmetallic and said outward metallic members.

6. In a silent chain the combination of a continuous run of metallic toothed links through the center of the silent chain; continuous runs of nonmetallic toothed links adjacent said central run of metallic toothed links; and pins connecting said continuous runs of metallic and nonmetallic toothed links together.

7. In a silent chain the combination of nonmetallic links; a plurality of pins connecting said nonmetallic links together in a continuous chain; pairs of metallic shroud plates connecting pairs of pins to form gapped and completely separated shrouded sets; and metallic links closing the gaps and extending from one shrouded set to another.

8. In a chain the combination of metallic toothed links; nonmetallic toothed links; metallic shrouds; and pins.

9. In a chain the combination of a plurality of metallic pins; a plurality of pairs of metallic shrouds connecting the ends of said pins to comprise shrouded sets; a plurality of toothed nonmetallic links made of a rigid synthetic material absorbing lubricating oil, positioned adjacent said shrouds; and a plurality of toothed metallic links, positioned adjacent to and between the nonmetallic links.

10. In a silent chain the combination of a continuous interconnected alternate single and double center run of toothed metallic links; a continuous run of interconnected nonmetallic toothed links adjacent said single and double metalic links; pins, and alternate pairs of shroud plates forming shrouded sets.

11. In a silent chain the combination of metallic pins; metallic shrouds; a continuous center run of toothed metallic links; continuous outside runs of toothed nonmetallic links made of stiff, resilient, synthetic, oil absorbing material; and means connecting said metallic links, nonmetallic links and shrouds together.

12. In a chain the combination of a plurality of nonmetallic links made of "Micarta" and arranged to form the central portion of a chain; a plurality of metallic links; a plurality of metallic shrouds, said metallic links and metallic shrouds being arranged beside said nonmetallic links to form the outer portions of a chain; and a plurality of pins connecting said metallic links, nonmetallic links and shrouds.

13. In a silent chain the combination of unshrouded sets comprising two kinds of toothed links made of two materials of different specific gravity; shrouded sets of substantially the same weight as the unshrouded sets, said identical weight being achieved by the use of suitable proportions of said two materials of different specific gravity; and pins connecting said shrouded and unshrouded sets together.

14. In a silent chain the combination of shrouded sets consisting of toothed links and metalic shroud plates; unshrouded sets consisting of nonmetallic toothed links made of stiff resilient oil absorbing synthetic plastic material, and metallic toothed links in such proportions that the weight of an unshrouded set is substantially the same as that of a shrouded set, the links of said unshrouded set having elongated holes; the nonmetallic toothed links forming a continuous run of nonmetallic connectors; the metallic links and shrouds forming a continuous run of metallic connectors; and pins connecting said shrouded and unshrouded sets together.

DONALD A. CUMFER.